(12) United States Patent
Han

(10) Patent No.: US 11,681,913 B2
(45) Date of Patent: Jun. 20, 2023

(54) METHOD AND SYSTEM WITH NEURAL NETWORK MODEL UPDATING

(71) Applicant: Samsung Electronics Co., Ltd., Suwon-si (KR)

(72) Inventor: Songyi Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 16/786,006

(22) Filed: Feb. 10, 2020

(65) Prior Publication Data

US 2021/0034971 A1 Feb. 4, 2021

(30) Foreign Application Priority Data

Aug. 2, 2019 (KR) .................. 10-2019-0094538

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ........ G06N 3/08; G06N 3/063; G06N 3/0454; G06N 20/00; G06N 5/04; G06N 3/0445; G06N 3/045; H04L 67/10; H04L 41/16; G06K 9/6256; G06V 10/774; G06V 10/82; G06V 10/764; G06F 18/217; G06F 40/30; G06F 17/18; G06T 2207/20081; G06T 2207/20084; G06T 2207/20076
See application file for complete search history.

(56) References Cited

U.S. PATENT DOCUMENTS

| | | | |
|---|---|---|---|
| 2018/0018590 A1* | 1/2018 | Szeto | G06N 20/10 |
| 2018/0089587 A1 | 3/2018 | Suresh et al. | |
| 2018/0300171 A1* | 10/2018 | Qiao | G06F 9/5088 |
| 2018/0316502 A1 | 11/2018 | Nadeau et al. | |
| 2019/0042937 A1 | 2/2019 | Sheller et al. | |
| 2019/0050515 A1 | 2/2019 | Su et al. | |
| 2019/0311298 A1* | 10/2019 | Kopp | G01C 25/00 |
| 2020/0104705 A1* | 4/2020 | Bhowmick | G06N 3/04 |

(Continued)

FOREIGN PATENT DOCUMENTS

KR 10-2019-0036422 A 4/2019

OTHER PUBLICATIONS

Upadhyay, "Knowledge Distillation," Neural Machine, Apr. 5, 2018, 10 pages, https://medium.com/neuralmachine/knowledge-distillation-dc241d7c2322.

(Continued)

*Primary Examiner* — Xilin Guo
(74) *Attorney, Agent, or Firm* — NSIP Law

(57) ABSTRACT

A method of updating a neural network model by a terminal device, includes training a local model using a local data set collected by a terminal device to generate a trained local model; receiving, from a server, an independent identically distributed (i.i.d.) global data set, the i.i.d. global data set being a data set sampled for each class in a plurality of predefined classes; implementing the trained local model by inputting the i.i.d. global data set and transmitting final inference results of the implemented trained local model to the server; and receiving, from the server, a global model updated based on the final inference results of the inference.

20 Claims, 6 Drawing Sheets

(56) References Cited

U.S. PATENT DOCUMENTS

2020/0334567 A1* 10/2020 Bhattacharjee ....... H04L 67/125
2021/0035059 A1* 2/2021 Atwood ............. G06Q 10/0831
2022/0001181 A1* 1/2022 Zylberberg ........ A61N 1/36078

OTHER PUBLICATIONS

Konecny et al., "Federated learning: Strategies for improving communication efficiency," Oct. 30, 2017, 10 pages.
Bonawitz et al., "Towards Federated Learning at Scale: System Design," Proceedings of the 2 nd SysML Conference, Palo Alto, CA, USA, 15 pages.
Sheller et al., "Multi-Institutional Deep Learning Modeling Without Sharing Patient Data: A Feasibility Study on Brain Tumor Segmentation," Oct. 22, 2018, 14 pages.
Jeong et al., "Communication-Efficient On-Device Machine Learning: Federated Distillation and Augmentation under Non-IID Private Data," 32nd Conference on Neural Information Processing Systems (NIPS 2018), 2nd Workshop on Machine Learning on the Phone and other Consumer Devices (MLPCD 2), Montreal, Canada, 6 pages.

* cited by examiner

METHOD AND SYSTEM WITH NEURAL NETWORK MODEL UPDATING

CROSS-REFERENCE TO RELATED APPLICATION

This application claims the benefit under 35 USC 119(a) of Korean Patent Application No. 10-2019-0094538, filed on Aug. 2, 2019, in the Korean Intellectual Property Office, the entire disclosure of which is incorporated herein by reference for all purposes.

BACKGROUND

1. Field

The following description relates to a method and system that include updating of an implemented neural network model.

2. Description of Related Art

Feature extraction, pattern recognition, and technical automation of various analyses may be realized by a neural network model implemented using a processor having a specialized calculation structure. Neural network models may be trained to perform intuitive feature extraction or recognition, mapping between input patterns and output patterns, recognition of input patterns, categorization, and various forms of classification. Trained neural network models may have a generalization ability such that relatively accurate and reliable outputs may be obtained even for input data sets that the neural network models have never learned. The generalization ability of neural network models is greatly influenced not only by the calculation structure thereof but also by the type or amount of data used for training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of updating a neural network model by a terminal device, includes training a local model using a local data set collected by a terminal device to generate a trained local model; receiving, from a server, an independent identically distributed (i.i.d.) global data set, the i.i.d. global data set being a data set sampled for each class in a plurality of predefined classes; implementing the trained local model by inputting the i.i.d. global data set and transmitting final inference results of the implemented trained local model to the server; and receiving, from the server, a global model updated based on the final inference results of the inference.

The local model may include a neural network trained to predict a class of the plurality of predefined classes corresponding to input data, and the final results of the inference may correspond to a hard label that indicates a class predicted for the i.i.d. sampled global data set.

The hard label may have a smaller data size than a soft label comprising information about probability values indicating respective probabilities that the i.i.d. sampled global data set is classified into each of the plurality of predefined classes.

The global model may be updated using a loss function having at least one of a ground truth (GT) label and the hard label as a variable.

Even when the global model and the local model have different structures, since the i.i.d. sampled global data set is shared between the server and the terminal device, the global model may be updated even when the terminal device transmits only the hard label to the server.

The global model may be updated in the server based on other final results of inference received from other terminal devices in addition to the final results of the inference received from the terminal device.

The i.i.d. sampled global data set may have a smaller data size than the local data set.

The local data set may include a data set sampled in a non-i.i.d. manner.

In another general aspect, a method of updating a neural network model by a server, includes transmitting, to a plurality of terminal devices, an independent identically distributed (i.i.d.) sampled global data set for each class in a plurality of predefined classes; receiving, from each of the plurality of terminal devices, final results of inference obtained by inputting the i.i.d. sampled global data set to a local model trained in each of the terminal devices based on a corresponding local data set; and updating a global model stored in the server based on the received final results of corresponding inferences from each of the plurality of terminal devices.

The final results of inference may correspond to a hard label indicating a class predicted for the i.i.d. sampled global data set by the trained local model.

The updating of the global model may be performed using a loss function having at least one of a ground truth (GT) label and the hard label as a variable.

The updating of the global model may be performed to reduce a difference between at least one of the GT label and the hard label and a calculation result obtained by inputting the i.i.d. sampled global data set to the global model.

The method may further include transmitting the updated global model to at least one of the terminal devices or another terminal device other than the plurality of terminal devices.

The updated global model may be used as a pre-trained local model for the other terminal device.

In another general aspect, a terminal device for updating a neural network model, includes at least one memory configured to store a local model trained using a local data set collected by the terminal device, and at least one processor. The at least one processor is configured to receive an independent identically distributed (i.i.d.) sampled global data set for each class in a plurality of predefined classes from a server, perform inference, in the terminal device, by inputting the i.i.d. sampled global data set to the trained local model and transmit final results of the inference to the server, and receive a global model updated based on the final results of the inference from the server.

The local model may include a neural network trained to predict a class of the plurality of predefined classes corresponding to input data, and the final results of the inference may correspond to a hard label that indicates a class predicted for the i.i.d. sampled global data set.

The hard label may have a smaller data size than a soft label including information about probability values indicating respective probabilities that the i.i.d. sampled global data set is classified into each class.

The global model may be updated using a loss function having at least one of a ground truth (GT) label and the hard label as a variable.

Even when the global model and the local model have different structures, since the i.i.d. sampled global data set is shared between the server and the terminal device, the global model may be updated even when the terminal device transmits only the hard label to the server.

The global model may be updated in the server based on other final results of inference received from other terminal devices in addition to the final results of the inference received from the terminal device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
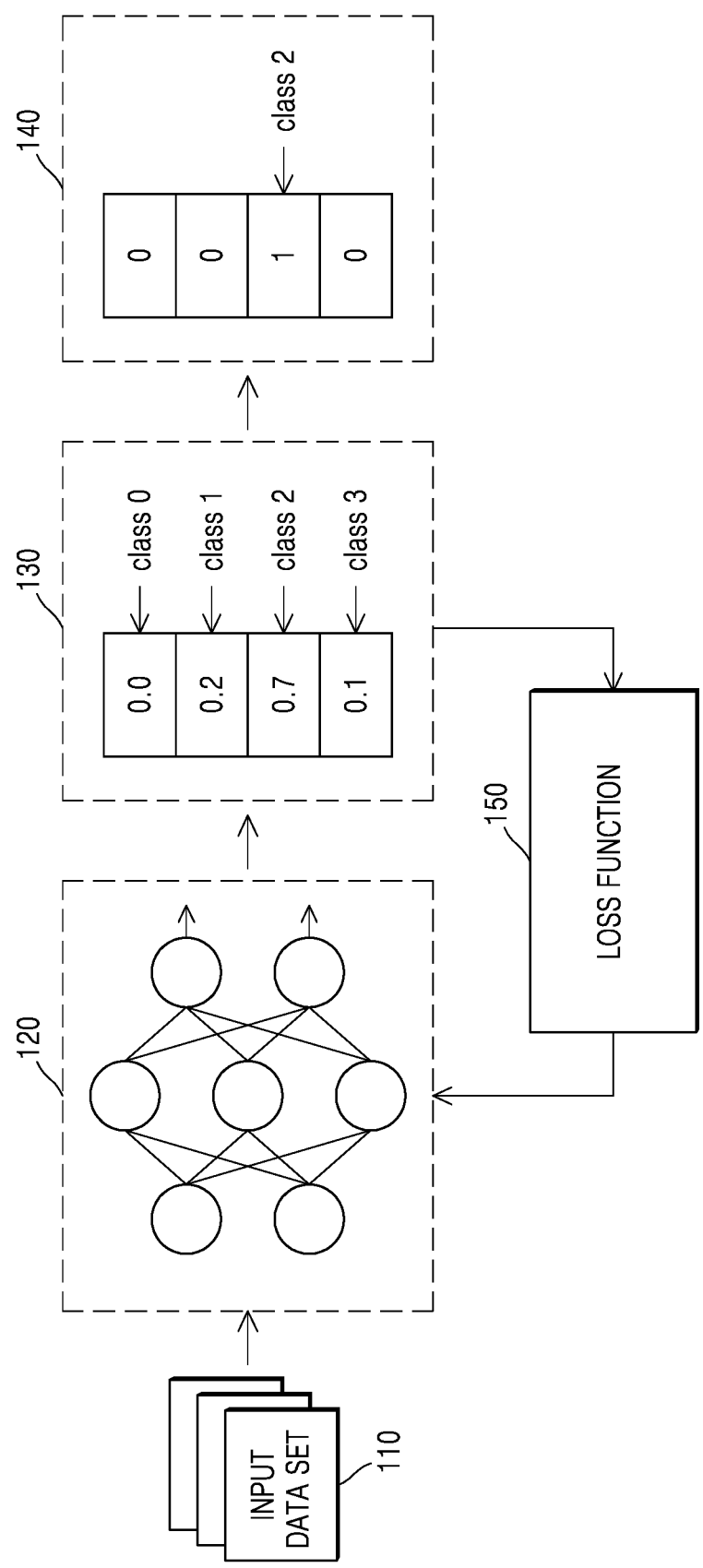
FIG. 1 is a view illustrating an example of a process in which a neural network model operates.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein below, there may be a desire to prepare various kinds of data sets for training neural network models. For example, when a system including a server and a plurality of terminal devices is used to update a neural network model, it may be desirable that the neural network model is trained using a data set prepared based on information collected by one or all of the plurality of terminal devices. However, problems such as excessive communication costs or leakage of personal information may arise depending on the size of data sets when data sets are transmitted between such server and plurality of terminal devices, and thus there may be a desire for a method of training a neural network model with minimized communication costs while protecting personal information, for example.

FIG. 1 is a view illustrating an example of a process in which a neural network model 120 operates.

Referring to FIG. 1, a process of a classification network in which input images are classified into one of a plurality of predefined classes (for example, class 0, class 1, class 2, and class 3) is illustrated. FIG. 1 illustrates a potential example for explaining an overall process in which the neural network model 120 operates, but it should be understood that the neural network model 120 is not limited to specific structures and implementation methods described below.

An input data set 110 may be input to the neural network model 120 to perform a training or an inference function. When the input data set 110 is a training data set, the neural network model 120 may be trained by at least one of supervised, semi-supervised, and/or unsupervised methods. When the neural network model 120 is already trained and the input data set 110 is input to the neural network model 120, the neural network model 120 may perform inference to predict a class corresponding to the input data set 110.

The neural network model 120 may be a deep neural network (DNN) or n-layer neural network, which has at least one hidden layer. Examples of the DNN may include but are not limited to, convolutional neural networks (CNNs), recurrent neural networks (RNNs), deep belief networks, and restricted Boltzmann machines, and the like.

For example, the neural network model 120 may be a DNN that includes a total of three layers (that is, an input layer, a hidden layer, and an output layer), for example, as shown in FIG. 1. However, this is merely an example as the neural network model 120 may have various structures and various numbers of layers which are different from those shown in FIG. 1. For example, the neural network model 120 may be a DNN including at least one of a convolution layer, a pooling layer, and a fully connected layer, and the number of layers of the neural network model 120 may be greater than three.

In addition, each layer of the neural network model 120 may include various numbers of nodes. Although FIG. 1 illustrates that only two nodes are included in the output layer, this is only for ease of illustration and not for purposes of limitation. The number of nodes included in the output layer may correspond to the number of classes into which the neural network model 120 may perform classification. For example, when the neural network model 120 performs classification into class 0, class 1, class 2, and class 3, as illustrated in FIG. 1, the number of nodes included in the output layer may be four.

The neural network model 120 may output a calculation result indicating which of a plurality of predefined classes corresponds to the input data set 110. For example, the neural network model 120 may output calculation results each indicating the possibility that the input data set 110 corresponds to each class, as result values for the classes. In addition, the neural network model 120 may include a softmax layer, and the softmax layer may convert the result values for the classes into probability values. The softmax layer may generate the probability values by normalizing the result values which indicate the possibility that the input data set 110 is classified into each of the classes.

In other words, when the input data set 110 is input to the neural network model 120, the neural network model 120 may output a soft label 130 as a result that contains information about probability values which indicate the probability the input data set 110 is to be classified into each class. The soft label 130 may be output in a vector form, and in this case, each component of the soft label 130 may be a probability value indicating the probability that the input data set 110 is to be classified into each class. For example, as shown in FIG. 1, the soft label 130 may include information indicating that: the probability that the input data set 110 is to be classified into class 0 is 0.0; the probability that the input data set 110 is to be classified into class 1 is 0.2; the probability that the input data set 110 is to be classified into class 2 is 0.7; and the probability that the input data set 110 is to be classified into class 3 is 0.1. Each component of the soft label 130 may be mapped to a corresponding class.

In addition, a hard label 140 indicating a class which is finally predicted for the input data set 110 may be obtained based on the soft label 130. The hard label 140 is a final result of inference performed by the neural network model 120 and may be determined by selecting a class corresponding to the component having the largest probability value among the components of the soft label 130. For example, an arg max function may be applied to the components of the soft label 130 to change the probability value corresponding to class 2 to the maximum value of 1, and accordingly, class 2 may be selected as a class corresponding to the input data set 110.

In addition, the soft label 130 may be used to retrain or update the neural network model 120. For example, the soft label 130 may be used as a variable of a loss function 150. The loss function 150 is a function indicating the error degree of calculation results of the neural network model 120 and may output a value corresponding to the difference between the soft label 130 that is output as results of a calculation of the neural network model 120 and a ground truth (GT) label that indicates an actual class corresponding to the input data set 110. For example, the loss function 150 may be a function that outputs a cross-entropy loss between the soft label 130 and the GT label. However, this is a non-limiting example, and the loss function 150 may be an L1 loss function that outputs a loss based on the absolute value of the difference between the soft label 130 and the GT label or may be an L2 loss function that outputs a loss based on the square of the absolute value of the difference between the soft label 130 and the GT label. The GT label may be determined directly by a user or may be pre-mapped and stored with the input data set 110.

According to a gradient descent algorithm that is an example of a method used to retrain or update the neural network model 120, the gradient of the loss function 150 is calculated and applied to the neural network model 120 to update model parameters (for example, weights) of the neural network model 120 for reducing the difference between the GT label and the soft label 130. Accordingly, when other input data sets are input to the neural network model 120, more accurate inference results may be obtained. In the following description given with reference to FIGS. 2 to 7, a method of updating a neural network model by a system of the present disclosure will be described while referring to the above-described process of the classification network.

Figure 2:
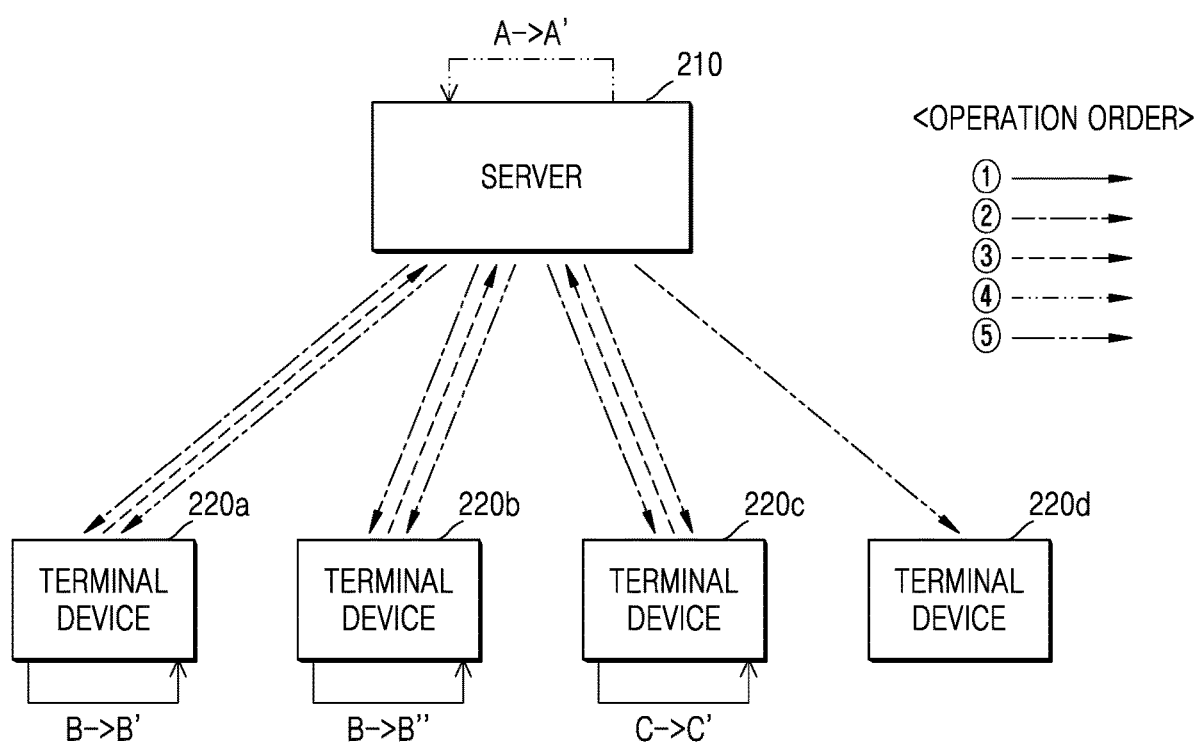
FIG. 2 is a view schematically illustrating an example of a system updating a neural network model.

FIG. 2 is a view schematically illustrating an example of a system for updating a neural network model.

Referring to FIG. 2, the system for updating a neural network model may include a server 210 and a plurality of terminal devices 220a to 220d. For ease of description, only four terminal devices 220a to 220d are shown, but the system may include more or fewer terminal devices.

The server 210 may communicate with the plurality of terminal devices 220a to 220d and may relay communication so that a network may be formed between the plurality of terminal devices 220a to 220d. For example, the server 210 may be a server operated by a provider that provides the plurality of terminal devices 220a to 220d to users and may provide management services for the plurality of terminal devices 220a to 220d.

Each of the plurality of terminal devices 220a to 220d may correspond to a robot device, such as a drone or an advanced driver assistance system (ADAS), a smart TV, a smartphone, a medical device, a mobile device, an image display device, a measurement device, an Internet of things (IoT) device, or at least one of various types of electronic devices.

The server 210 and the plurality of terminal devices 220a to 220d may respectively include neural network models and may cooperate with each other to update the neural network models stored therein. The neural network model stored in the server 210 may be referred to as a global model, and the neural network model stored in each of the plurality of terminal devices 220a to 220d may be referred to as a local model. For example, initially, the server 210 may store a global model A, the terminal device 220a and the terminal device 220b may store local models B, and the terminal device 220c may store a local model C. In FIG. 2, letters A, B, and C are used to indicate neural network models having different structures, and indicate different versions of the neural network models.

In operation ①, the terminal device 220a, the terminal device 220b, and the terminal device 220c may respectively train the local models B and C using local data sets respectively collected by the terminal device 220a, the terminal device 220b, and the terminal device 220c. For example, the terminal device 220a may update the local model B to a local model B' using a local data set collected by the terminal device 220a itself, and the terminal device 220b may update the local model B to a local model B" using a local data set collected by the terminal device 220b itself. Since the local data sets respectively collected by the terminal device 220a and the terminal device 220b may be different from each other, the local models B may be updated or trained differently by the terminal device 220a and the terminal device 220b.

In addition, the terminal device 220c, which originally stores the local model C different from those stored in the terminal device 220a and the terminal device 220b, may update the local model C to a local model C' using a local data set collected by the terminal device 220c itself. The terminal device 220d may be a new terminal device that does not yet store a local model.

The local models respectively stored in the terminal device 220a, the terminal device 220b, and the terminal device 220c may be classification networks as described with reference to FIG. 1, but are not limited thereto. The local models may be CNNs that perform segmentation, object detection, or the like, or may be RNNs that perform speech recognition, machine translation, or the like. That is, the local models may correspond to any DNNs without limitation.

In operation ②, the server 210 may transmit a global data set, which is sampled in an independent identically distributed (i.i.d.) manner for each class, to the terminal device 220a, the terminal device 220b, and the terminal device 220c. The global data set may a well-refined sample data set, unlike the local data sets collected by the terminal device 220a, the terminal device 220b, and the terminal device 220c. For example, the global data set may be sampled such that probability variables respectively corresponding to classes may have the same probability distribution and may be independent of each other. Therefore, the global data set may be distinguished from the local data sets that include a non-i.i.d. data set.

In addition, it may not be required to transmit the same global data set to the terminal device 220a, the terminal device 220b, and the terminal device 220c. The terminal device 220a, the terminal device 220b, and the terminal device 220c may receive different global data sets as long as the global data sets are sampled for each class in an i.i.d. manner. For example, each of the terminal device 220a, the terminal device 220b, and the terminal device 220c may receive a subset of an entire global data set sampled in an i.i.d. manner. The subsets respectively transmitted to the terminal device 220a, the terminal device 220b, and the terminal device 220c may include some identical data samples and some different data samples.

In operation ③, the terminal device 220a, the terminal device 220b, and the terminal device 220c may perform inference by inputting the global data set to the trained local models and may transmit results of the inference to the server 210. Here, the local models are neural networks trained to predict a class corresponding to input data among a plurality of predefined classes, and the results of the inference may correspond to hard labels, each indicating a class predicted for the global data set.

In operation ④, the server 210 may update the global model A to a global model A' using the results of the inference received from the terminal device 220a, the terminal device 220b, and the terminal device 220c. For example, the server 210 may use the results of the inference (that is, hard labels), received from the terminal device 220a, the terminal device 220b, and the terminal device 220c, instead of using a GT label which is described with reference to FIG. 1. For example, the server 210 may obtain calculation results by inputting a global data set to the global model and may generate a loss function which has, as variables, the obtained calculation results and the inference results (that is, hard labels) received from the terminal device 220a, the terminal device 220b, and the terminal device 220c. In addition, the server 210 may update the global model and the model parameters using the generated loss function such that the difference between the obtained calculation results and the inference results (that is, hard labels) received from the terminal device 220a, the terminal device 220b, and the terminal device 220c may be reduced.

In addition, the server 210 may update the global model by using a GT label in addition to using the inference results (that is, hard labels) received from the terminal device 220a, the terminal device 220b, and the terminal device 220c. In this case, the loss function may include both the GT label and the hard labels as variables. The global model may be such a classification network as described with reference to FIG. 1 but is not limited thereto. The global model may be a CNN that performs segmentation, object detection, or the like, or may be an RNN that performs speech recognition, machine translation, or the like. That is, the global model may correspond to any DNN without limitation.

As described above, the system of the embodiments does not use an entire local data set collected by each terminal device to update a neural network model, but uses a hard label obtained as a result of inference in the local model of each of the terminal devices 220a, 220b, and 220c such that personal information may not leak during communication between the server 210 and each of the terminal devices 220a, 220b, and 220c.

In addition, to assist updating of the global model, which is performed by the server 210, the system of the embodiments may use a hard label instead of transmitting entire model parameters (for example, weights or gradients) of the local model of each of the terminal devices 220a, 220b, and 220c or transmitting a soft label output as an intermediate calculation result in the local model. Since the hard label has a much smaller data size than model parameters or a soft label, costs for communication between the server 210 and each of the terminal devices 220a, 220b, and 220c may be significantly reduced. One of the reasons for this is that the model parameters or soft labels increase communication costs as the size of models or the number of classes increases, but the hard label contains information about only a class corresponding to a final result of the inference of the local model.

In the system of the embodiments, even when the global model stored in the server 210 and the local model stored in each of the terminal devices 220a, 220b, and 220c have different structures, since the server 210 and the terminal devices 220a, 220b, and 220c share the global data set, the global model may be updated even in the case in which each of the terminal devices 220a, 220b, and 220c transmits only a hard label to the server 210.

In addition, in the system of the embodiments, since only hard labels, which include no information about local models, are used, the global model may be updated regardless of whether the local models stored in the terminal devices 220a, 220b, and 220c have identical or different structures.

In operation ⑤, the server 210 may transmit the updated global model to at least one of the terminal devices 220a, 220b, and 220c, or the other terminal device 220d. The updated global model may replace the existing local models of the terminal devices 220a, 220b, and 220c and may be used as a pre-trained local model of the other terminal device 220d. For example, transmission of the updated global model from the server 210 to the plurality of terminal devices 220a to 220d may correspond to a software update by the server 210.

Figure 3:
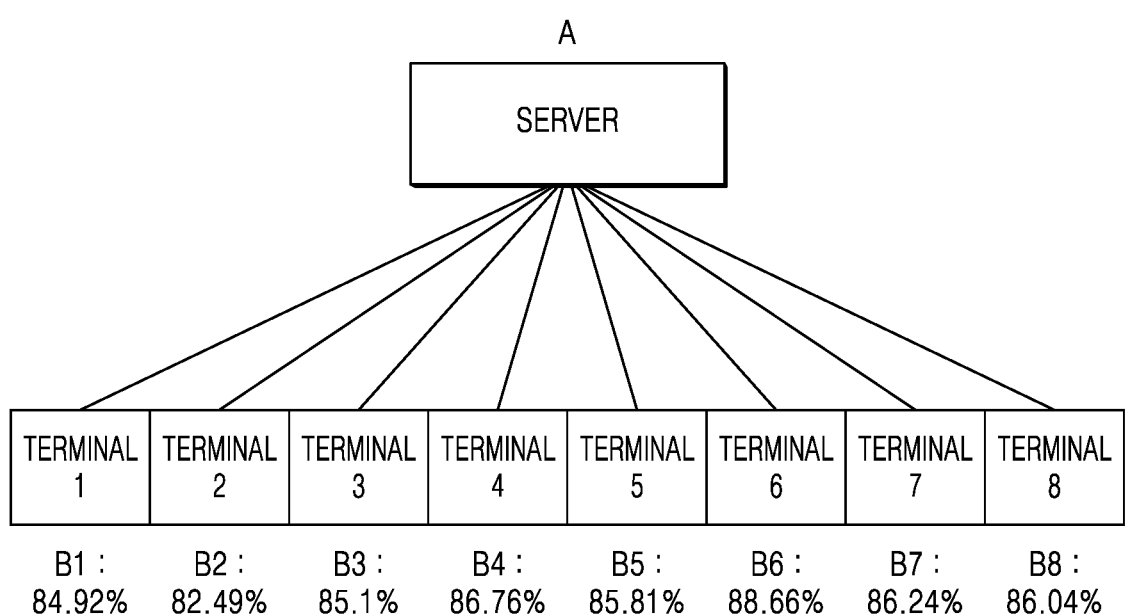
FIG. 3 is a view illustrating an example of an experimental environment for verifying training effects of a system that updates a neural network model.

FIG. 3 is a view illustrating an example of an experimental environment for verifying training effects of a system that updates a neural network model.

FIG. 3 illustrates an example in which one server and eight terminals update a global model according to the method of updating a neural network model described with reference to FIG. 2, for example.

First, for example, terminals 1 to 8 may use two hundred of Modified National Institute of Standards and Technology (MNIST) samples which are sampled in a non-i.i.d. manner to train local models (for example, local models B1 to B8) respectively stored therein. MNIST provides a large database of handwritten digits, which is referred to as a data set widely used for training various image processing systems. Since local data sets respectively collected by the terminals 1 to 8 may have different characteristics, MNIST samples, which are sampled in a non-i.i.d. manner, may be used to simulate the case in which each of the terminals 1 to 8 collects a local data set.

As a result of the training, the local model B1 stored in the terminal 1 has an accuracy of 84.92%, the local model B2 stored in the terminal 2 has an accuracy of 82.49%, the local model B3 stored in the terminal 3 has an accuracy of 85.1%, the local model B4 stored in the terminal 4 has an accuracy of 86.76%, the local model B5 stored in the terminal 5 has an accuracy of 85.81%, the local model B6 stored in the terminal 6 has an accuracy of 88.66%, the local model B7 stored in the terminal 7 has an accuracy of 86.24%, and the local model B8 stored in the terminal 8 has an accuracy of 86.04%.

Thereafter, the terminals 1 to 8 may perform inference using the local models thereof for fifty MNIST samples (five samples for each class), for example, which are sampled in an i.i.d. manner, and transmit results of the inference to the server. The server trains a global model A by incorporating results of inference received from at least one of the terminals 1 to 8 as a variable of a loss function. Results of training of the global model A by the server are shown in Table 1 below.

TABLE 1

| Cases | Global model accuracy |
|---|---|
| Training with fifty MNIST samples (baseline) | 77.8% |
| Baseline + additional training with results of inference of two terminals (terminals 1 and 2) | 78.06% |
| Baseline + additional training with results of inference of four terminals (terminals 1 to 4) | 80.11% |
| Baseline + additional training with results of inference of eight terminals (terminals 1 to 8) | 80.19% |

In Table 1 above, the baseline indicates the case in which the server performs training with only fifty MNIST samples without using the results of inference received from at least one of the terminals 1 to 8. Referring to Table 1, it may be seen that the accuracy of the updated global model A increases as the number of terminals that the server uses for receiving results of inference increases.

In addition, according to the embodiments, the global model A may be sufficiently trained using only a global data set (corresponding to fifty MNIST samples which are sampled in an i.i.d. manner) which is much smaller than a local data set (corresponding to two hundreds of MNIST samples which are sampled in a non-i.i.d. manner) collected by each terminal for training. However, the above-described experimental results do not mean that the size of a global data set should be smaller than the size of local data sets, but is for showing that the global model A is sufficiently trainable even when the size of a global data set is smaller than the size of local data sets. The global data set may have a larger data size than the local data sets.

Server-terminal communication costs for updating the global model A may correspond to the "global data set size x compression ratio." As described above, according to the embodiments, a neural network model may be trained with low communication costs while protecting personal information, and a global model reflecting user characteristics may be obtained.

Figure 4:
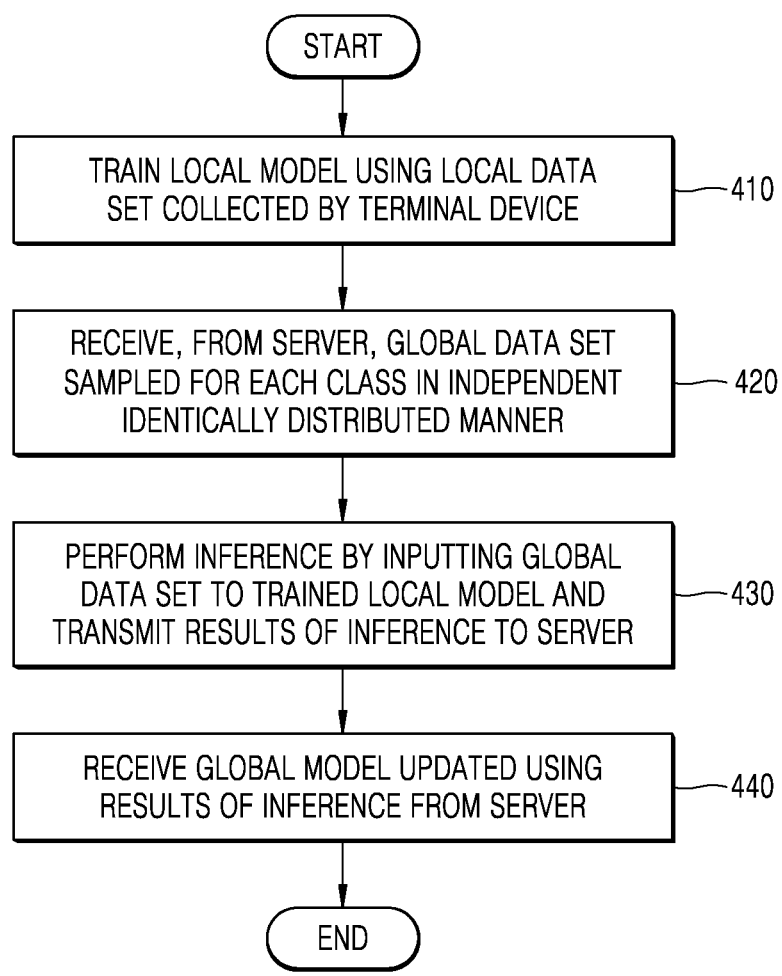
FIG. 4 is a flowchart illustrating an example of a method of updating a neural network model by a terminal device.

FIG. 4 is a flowchart illustrating an example of a method of updating a neural network model using a terminal device.

Referring to FIG. 4, the method of updating a neural network model using a terminal device includes time-series operations, which are performed by a terminal device in the system for updating a neural network, which is described with reference to FIG. 2. Therefore, the description given above with reference to the drawings may be applied to the method shown in FIG. 4 even though the description is not provided below.

In operation 410, the terminal device may train a local model using a local data set collected by the terminal device. The local model may be a neural network trained to predict a class corresponding to input data among a plurality of predefined classes, and the local data set may include a data set that is sampled in a non-i.i.d. manner.

In operation 420, the terminal device may receive, from a server, a global data set, which is sampled for each class in an i.i.d. manner. Alternatively, the global data set may not be received from the server but may be previously stored in the terminal device. In addition, information and classes included in the global data set may be updated to reflect a user's request. The update of the global data set may be performed by the server, but is not limited thereto, and may also be performed by the terminal device.

In operation 430, the terminal device may input the global data set to the trained local model to perform inference and may transmit results of the inference to the server. The results of inference are a final output of the inference performed by the local model and may correspond to a hard label indicating a class predicted for the global data set. The hard label may have a smaller data size than a soft label that includes information about probability values indicating the probability that the global data set is classified into each class.

In operation 440, the terminal device may receive, from the server, a global model that is updated using the results of inference. The global model may be updated using a loss function that has at least one of a GT label and the hard label as a variable. For example, the loss function may be determined according to Equation 1 below.

$$\text{total loss} = \alpha \text{loss}(y_A, y_{GT}) + \beta \text{loss}(y_A, y_B),\quad \text{Equation 1:}$$

where loss( ) may refer to a loss function, and $y_A$ may be a calculation result indicating the possibility that a global data set corresponds to each class and may be obtained as the server inputs the global data set to the global model. In addition, $y_{GT}$ may refer to a GT label, and $y_B$ may refer to a hard label received from the terminal device. $\alpha$ and $\beta$ may refer to real numbers equal to or greater than zero, and weights for a loss function based on the GT label and a loss function based on the hard label may be determined by $\alpha$ and $\beta$. In addition, $\alpha$ and $\beta$ are not all zero, and for example, $\beta$ may be $1-\alpha$.

The loss function loss( ) may output: a cross-entropy loss between two variables input to the loss function loss( ) an L1 loss based on the absolute value of the difference between two variables input to the loss function loss( ) or an L2 loss based on the square of the absolute value of the difference between two variables input to the loss function loss( ). However, this is a non-limiting example, and the loss function loss( ) may be any function that outputs a value corresponding to the difference between two variables input to the loss function loss( ).

The global model may be updated using inference results received from other terminal devices in addition to inference results received from the terminal device. As the global model is updated using inference results received from a plurality of terminal devices, the accuracy of the updated global model may be further improved.

Although the data size of the global data set is smaller than the data size of the local data set, sufficient accuracy improvements may be achieved using only the global data set as described above with reference to FIG. 3. Even when the global model stored in the server and the local model stored in the terminal device have different structures, since the global data set is shared between the server and the terminal device, the global model may be updated even in the case in which the terminal device transmits only the hard label to the server.

Figure 5:
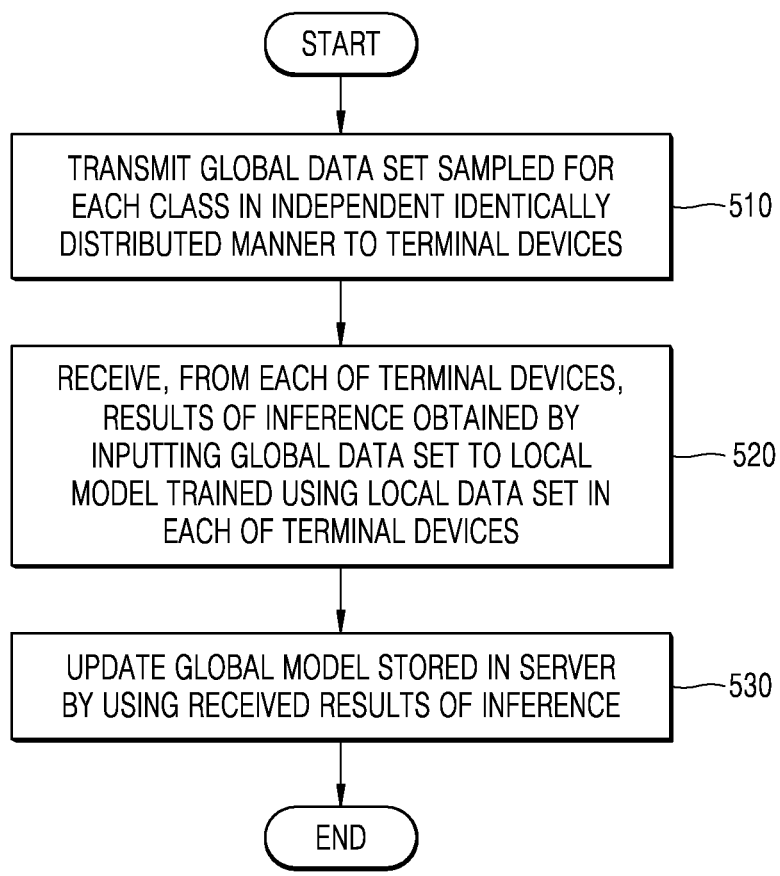
FIG. 5 is a flowchart illustrating an example of a method of updating a neural network model by a server.

FIG. 5 is a flowchart illustrating an example of a method of updating a neural network model by a server.

Referring to FIG. 5, the method of updating a neural network model using a server includes time series operations, which are performed by a server in the system for updating a neural network which is described with reference to FIG. 2. Therefore, the description given above with reference to the drawings may be applied to the method shown in FIG. 5 even though the description is not provided below.

In operation 510, the server may transmit a global data set, which is sampled for each class in an i.i.d. manner, to a plurality of terminal devices. It may not be required to transmit the same global data set to the plurality of terminal devices. The server may respectively transmit different global data sets to each of the plurality of terminal devices as long as the global data sets are sampled for classes in an i.i.d. manner. For example, the server may respectively transmit subsets of an entire global data set, which are sampled for classes in an i.i.d. manner, to the plurality of terminal devices.

In operation 520, the server may receive, from each of the plurality of terminal devices, results of inference obtained by inputting the global data set to a local model which is trained in each of the plurality of terminal devices by using a local data set. The results of inference received from each of the plurality of terminal devices may correspond to a hard label indicating a class predicted for the global data set by the trained local model.

In operation 530, the server may update a global model stored in the server by using the received inference results (that is, hard labels). For example, the server may update the global model using a loss function that has at least one of a GT label and a hard label as a variable. For example, the server may generate a loss function according to Equation 1 above and may update the global model using the generated loss function such that the difference between at least one of the GT label and the hard label and a calculation result obtained by inputting the global data set to the global model may decrease.

In addition, the server may transmit the updated global model to at least one of the plurality of terminal devices or another terminal device other than the plurality of terminal devices. The server may transmit the entire updated global model, or may perform model compression on the updated global model and then transmit the compressed updated global model. The case in which the server transmits the updated global model to the plurality of terminal devices may correspond to a software update. In addition, the updated global model may also be used as a pre-trained local model of a new terminal device.

Figure 6:
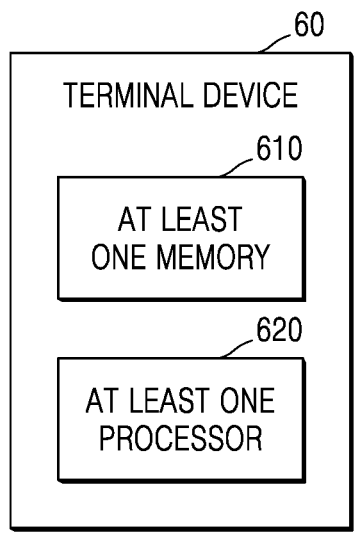
FIG. 6 is a block diagram illustrating an example of a structure of a terminal device.

FIG. 6 is a block diagram illustrating an example of a structure of a terminal device 60.

Referring to FIG. 6, the terminal device 60 may include at least one memory 610 and at least one processor 620. Components of the terminal device 60 which relate to embodiments are shown in FIG. 6. The terminal device 60 may further include other purposed components in addition to the components shown in FIG. 6. For example, in an example, the terminal device 60 may further include a sensor module, a communication module, an input/output module, a power control device, or the like.

In addition, the terminal device 60 may correspond to the terminal devices shown in FIGS. 2 to 4. In addition, the terminal device 60 may perform the time series operations illustrated in FIG. 4. Therefore, the above descriptions of the terminal devices shown in FIGS. 2 to 4 may be applied to the terminal device 60 shown in FIG. 6 even when the descriptions are not given below.

The at least one memory 610 may be hardware for storing various process data of the terminal device 60, and for example, the at least one memory 610 may store data processed in the terminal device 60 and data to be processed in the terminal device 60. In addition, the at least one memory 610 may store applications, drivers, or the like to be executed by the terminal device 60. Examples of the at least one memory 610 may include random access memory (RAM) such as dynamic random access memory (DRAM) and static random access memory (SRAM), read-only memory (ROM), electrically erasable programmable read-only memory (EEPROM), a CD-ROM, a Blu-ray disc storage or another optical disc storage, a hard disk drive (HDD), a solid state drive (SSD), and a flash memory. The at least one memory 610 may store a local model trained using a local data set collected by the terminal device 60.

The at least one processor 620 may be implemented by one or a plurality of processors. For example, the at least one processor 620 may be implemented as an array of multiple logic gates, or may be implemented as a combination of a general-purpose microprocessor and a memory in which programs that may be executed by the microprocessor are stored. For example, the at least one processor 620 may be a central processing unit (CPU), a graphics processing unit (GPU), a hardware accelerator, or the like.

The at least one processor 620 may have an overall role of controlling the terminal device 60. For example, the at least one processor 620 may overall control the terminal device 60 by executing the programs stored in the at least one memory 610 of the terminal device 60.

The at least one processor 620 may train the local model stored in at least one memory 610 using the local data set. The local model may be a neural network trained to predict a class corresponding to input data among a plurality of predefined classes.

The at least one processor 620 may receive, from a server, a global data set, which is sampled for each class in an i.i.d. manner. The global data set may have a smaller data size than the local data set. The local data set may include a data set that is sampled in a non-i.i.d. manner, but the global data set may be sampled such that probability variables respectively corresponding to classes may have the same probability distribution and may be independent of each other.

The at least one processor 620 may input the global data set to the trained local model to perform inference and may transmit results of the inference to the server. In this case, the results of inference transmitted to the server may correspond to a hard label indicating a class predicted for the global data set. The hard label may have a smaller data size than a soft label that includes information about probability values indicating the probability that the global data set is classified into each class. Even when the global model and the local model have different structures, since the global data set is shared between the server and the terminal device 60, the global model may be updated even in the case in which the at least one processor 620 transmits only the hard label to the server.

The at least one processor 620 may receive, from the server, the global model, which is updated using the results of inference. The at least one processor 620 may update a neural network model by replacing the local model with the received global model.

The global model may be updated using a loss function that has at least one of a GT label and the hard label as a variable. The global model may be updated using results of inference received from other terminal devices in addition to the results of inference received from the terminal device 60, and thus the accuracy of the updated global model may be further improved.

Figure 7:
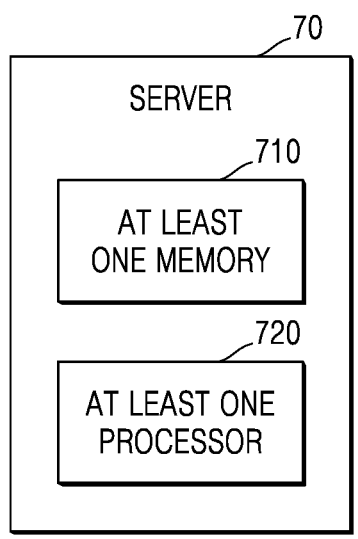
FIG. 7 is a block diagram illustrating an example of a structure of a server.

FIG. 7 is a block diagram illustrating a structure of a server according to some embodiments.

Referring to FIG. 7, the server 70 may include at least one memory 710 and at least one processor 720. Components of the server 70, which relate to the embodiments are only shown in FIG. 7. Therefore, it is apparent to those skilled in the art that the server 70 may further include general-purpose components in addition to the components shown in FIG. 7. For example, the server 70 may further include an input unit, an output unit, a communication unit, or the like.

In addition, the server 70 may correspond to the servers described with reference to FIGS. 2, 3, and 5. In addition, the server 70 may perform the time series operations illustrated in FIG. 5. Therefore, the above descriptions of the servers shown in FIGS. 2, 3, and 5 may be applied to the server 70 shown in FIG. 7, even though the descriptions are not given below.

The at least one memory 710 may store programs for processing and controlling the at least one processor 720 and may store data input to or output from the server 70. The at least one memory 710 may include at least one type of recording medium selected from a flash memory, a hard disk, a micro multimedia card, a memory card (for example, a secure digital (SD) card or an extreme digital (XD) card), random access memory (RAM), static random access memory (SRAM), a read-only memory (ROM), electrically erasable programmable read-only memory (EEPROM), programmable read-only memory (PROM), a magnetic memory, a magnetic disk, and an optical disk.

The at least one processor 720 typically controls the overall operation of the server 70. For example, the at least one processor 720 may generally control the input unit, the output unit, and the communication unit by executing the programs stored in the at least one memory 710. In addition, the at least one processor 720 may perform functions of the server 70, which are described with reference to FIGS. 2, 3, and 5 by executing the programs stored in the at least one memory 710. The at least one processor 720 may include a plurality of processors or one integrated processor according to the function or role of the at least one processor 720.

The at least one processor 720 may transmit a global data set, which is sampled for each class in an i.i.d. manner to a plurality of terminal devices.

The at least one processor 720 may receive, from each of the plurality of terminal devices, results of inference obtained by inputting the global data set to a local model which is trained in each of the plurality of terminal devices by using a local data set. The results of inference received from each of the plurality of terminal devices may correspond to a hard label indicating a class predicted for the global data set by the trained local model.

The at least one processor 720 may update a global model stored in the at least one memory 710 by using the received results of inference (that is, hard labels). For example, the at least one processor 720 may update the global model using a loss function that has at least one of a GT label and a hard label as a variable. For example, the at least one processor 720 may generate a loss function according to Equation 1 above and may update the global model using the generated loss function such that the difference between at least one of the GT label and the hard label and a calculation result obtained by inputting the global data set to the global model may decrease.

In addition, the at least one processor 720 may transmit the updated global model to at least one of the plurality of terminal devices or another terminal device other than the plurality of terminal devices. The at least one processor 720 may transmit the entire updated global model, or may perform a model compression on the updated global model and may then transmit the compressed updated global model. The case in which the at least one processor 720 transmits the updated global model to the plurality of terminal devices may correspond to a software update. In addition, the updated global model may also be used as a pre-trained local model of a new terminal device.

The servers, server 210, 70, terminal devices, terminal devices 220a to 220d, 60 in FIGS. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD−Rs, CD+Rs, CD−RWs, CD+RWs, DVD-ROMs, DVD−Rs, DVD+Rs, DVD−RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    training a local model using a local data set collected by a terminal device to generate a trained local model;
    receiving, from a server, an independent identically distributed (i.i.d.) global data set, the i.i.d. global data set being a data set sampled in an independent identically distributed manner (i.i.d. manner) for each class in a plurality of predefined classes where sampling of the i.i.d. global data set in the i.i.d. manner includes sampling the i.i.d. global data set such that probability variable respectively corresponding to the classes have a same probability distribution and are independent of each other;
    implementing the trained local model by inputting the i.i.d. global data set and transmitting final inference results of the implemented trained local model to the server; and
    receiving, from the server, a global model updated based on the final inference results of the inference.

2. The method of claim 1, wherein
    the trained local model comprises a neural network trained to predict a class of the plurality of predefined classes corresponding to input data, and
    the final inference results of the inference correspond to a hard label that indicates a class predicted for the i.i.d. global data set.

3. The method of claim 2, wherein
    the hard label has a smaller data size than a soft label that comprises information about probability values indicating respective probabilities for the i.i.d. global data set being classified into each of the plurality of predefined classes.

4. The method of claim 2, wherein the global model is updated using a loss function having at least one of a ground truth (GT) label and the hard label as a variable.

5. The method of claim 2, wherein,
    receipt of the updated global model is performed even when the terminal device transmits only the hard label to the server and even when the global model and the trained local model have different structures.

6. The method of claim 1, wherein the global model is updated in the server based on other final inference results received from other terminal devices in addition to the final inference results received from the terminal device.

7. The method of claim 1, wherein the i.i.d. global data set has a smaller data size than the local data set.

8. The method of claim 1, wherein the local data set comprises a data set sampled in a non-i.i.d. manner.

9. A processor-implemented method, comprising:
    transmitting, to a plurality of terminal devices, an independent identically distributed (i.i.d.) global data set, the i.i.d. global data set being a data set sampled in an independent identically distributed manner (i.i.d. manner) for each class in a plurality of predefined classes where sampling of the i.i.d. global data set in the i.i.d. manner includes sampling the i.i.d. global data set such that probability variable respectively corresponding to the classes have a same probability distribution and are independent of each other;
    receiving, from each of the plurality of terminal devices, final inference results of inference obtained by inputting the i.i.d. global data set to a local model trained in each of the terminal devices based on a corresponding local data set; and
    updating a global model stored in a server based on the received final inference results of corresponding inferences from each of the plurality of terminal devices.

10. The method of claim 9, wherein the final inference results of inference correspond to a hard label that indicates a class predicted for the i.i.d. global data set by the trained local model.

11. The method of claim 10, wherein the updating of the global model is performed using a loss function having at least one of a ground truth (GT) label and the hard label as a variable.

12. The method of claim 11, wherein the updating of the global model is performed to reduce a difference between at least one of the GT label and the hard label and a calculation result obtained by inputting the i.i.d. global data set to the global model.

13. The method of claim 9, further comprising transmitting the updated global model to at least one of the terminal devices or another terminal device other than the plurality of terminal devices.

14. The method of claim 13, wherein the updated global model is used as a pre-trained local model for the other terminal device.

15. A terminal device, comprising:
    at least one memory configured to store a local model trained using a local data set collected by the terminal device; and
    at least one processor configured to:
        receive an independent identically distributed (i.i.d.) global data set, the i.i.d. global data set being a data set sampled in an independent identically distributed manner (i.i.d. manner) for each class in a plurality of predefined classes from a server where sampling of the i.i.d. global data set in the i.i.d. manner includes sampling the i.i.d. global data set such that probability variable respectively corresponding to the classes have a same probability distribution and are independent of each other;
        implementing the trained local model by inputting the i.i.d. global data set and transmit final inference results of the implemented trained local model to the server; and
        receive a global model updated based on the final inference results of the inference from the server.

16. The terminal device of claim 15, wherein
    the trained local model comprises a neural network trained to predict a class of the plurality of predefined classes corresponding to input data, and the final inference results of the inference correspond to a hard label that indicates a class predicted for the i.i.d. global data set.

17. The terminal device of claim 16, wherein the hard label has a smaller data size than a soft label that comprises information about probability values indicating respective probabilities for the i.i.d. global data set being classified into each of the plurality of predefined classes.

18. The terminal device of claim 16, wherein the global model is updated using a loss function having at least one of a ground truth (GT) label and the hard label as a variable.

19. The terminal device of claim 16, wherein, receipt of the global model is performed even when the terminal device transmits only the hard label to the server and even when the global model and the trained local model have different structures.

20. The terminal device of claim 15, wherein the global model is updated in the server based on other final inference results of inference received from other terminal devices in addition to the final inference results of the inference received from the terminal device.

\* \* \* \* \*